US005337121A

United States Patent [19]

Borostyan et al.

[11] Patent Number: 5,337,121

[45] Date of Patent: Aug. 9, 1994

[54] VARIABLE MAGNIFICATION COPYING APPARATUS

[75] Inventors: Stephen Borostyan, Victor; David M. Borostyan, Rochester, both of N.Y.

[73] Assignee: Xerox Corporation, Stamford, Conn.

[21] Appl. No.: 30,973

[22] Filed: Mar. 12, 1993

[51] Int. Cl.[5] .................................... G03B 27/34

[52] U.S. Cl. .................................... 355/57; 355/51; 355/243

[58] Field of Search .................................... 355/243, 51, 57

[56] References Cited

U.S. PATENT DOCUMENTS

| | | | |
|---|---|---|---|
| 4,027,963 | 6/1977 | Happner et al. | 355/8 |
| 4,040,073 | 8/1977 | Satomi | 355/8 |
| 4,172,658 | 10/1979 | Tani et al. | 355/55 |
| 4,374,619 | 2/1983 | Spinelli et al. | 355/57 |
| 4,475,156 | 10/1984 | Federico et al. | 364/300 |
| 4,498,759 | 2/1985 | Ogawa et al. | 355/8 |
| 4,538,904 | 9/1985 | Lane | 355/57 |
| 4,639,121 | 1/1987 | Looney | 355/14 R |
| 4,953,958 | 9/1990 | Katsuma et al. | 350/425 |
| 4,996,556 | 2/1991 | Gray, Jr. | 355/50 |
| 5,063,406 | 11/1991 | Braun et al. | 355/57 |

FOREIGN PATENT DOCUMENTS

| | | | |
|---|---|---|---|
| 60-78439 | 5/1985 | Japan | G03B 27/34 |

OTHER PUBLICATIONS

"Optical Reduction System", Xerox Disclosure Journal, vol. 5, No. 1, Jan./Feb. 1980., p. 97.

*Primary Examiner*—Michael L. Gellner
*Assistant Examiner*—Daniel P. Malley

[57] ABSTRACT

A variable magnification copier apparatus includes an optical system which incorporates two pairs of moving mirror assemblies which are moved to maintain object and image conjugate requirements following magnification changes. Also included is a constant focal length lens movable between two segments of a folded optical path. The optical system provides a magnification range of between 0.45X and 2.0X, while positioning the optical elements in a compact design. The lens does not move along the optical path, but rather remains fixed in position along one path segment so long as magnification values are selected within a certain range. When the magnification value is selected outside the predetermined range, the lens moves to an adjacent segment of the optical path and remains in a second, fixed position so long as further magnification values are selected within a second range. When a range is selected outside the second range, the lens is moved back to the first position.

11 Claims, 4 Drawing Sheets

VARIABLE MAGNIFICATION COPYING APPARATUS

BACKGROUND AND MATERIAL DISCLOSURE STATEMENT

The present invention relates to a variable magnification copying apparatus and, more particularly, to an optical system for such an apparatus which includes a fixed focal length lens for forming an image of the document to be copied, moving mirror pairs to adjust object and image conjugates for any selected magnification and means for moving the lens from one segment of the optical path to another upon selection of a predetermined magnification value.

A variety of copiers are commercially used which produce reduced or enlarged copies of original documents. A preferred optical system incorporates optical elements which scan a document line by line. The following patents illustrate the various optical systems used to enable the variable magnification.

U.S. Pat. Nos. 4,498,759 and 4,538,904 are illustrative of optical systems which scan a stationary document placed in an object plane. Full rate/half rate mirrors move to adjust object and image conjugates, while a fixed focal length lens moves along the optical path to selected positions, depending upon magnification selection.

U.S. Pat. No. 5,063,406 illustrates an optical system where the document is moved past a fixed exposure station and where a zoom lens is adapted to enlarge and reduce the scanned image.

U.S. Pat. Nos. 4,040,733; 4,172,658 and 4,639,121 disclose variable magnification systems where the imaging lens moves along the optical path to different magnification locations and also moves perpendicular to the axis to maintain registration. A compact optical design is a desirable objective when designing a variable magnification copier. Prior art efforts to provide a compact design are disclosed in U.S. Pat. Nos. 4,027,963 and 4,374,619. These patents incorporate a half lens element which includes a mirror in the lens assembly, reducing the need for an additional folding mirror elsewhere along the optical path, thus making the system more compact. Reduction copying in a limited space is also disclosed in "Optical Reduction System", Xerox Disclosure Journal, Vol. 5, No. 1, January/February 1980, page 97.

The present invention is directed towards a novel, variable magnification optical system which incorporates mirror pairs movable along an optical path to adjust object and image conjugates during magnification changes, but which does not require lens translation along the optical path. Rather, the lens, which in a preferred embodiment, is a constant focal length wide angle lens, is maintained in a fixed position so long as magnification selections are made within a first range. The lens is in fixed position along one segment of a folded optical path. Upon selection of a magnification lying within a second magnification range, the lens, in a preferred embodiment, is moved perpendicular to the optical path to an adjacent parallel segment of the optical path, placing the lens either closer to the photoreceptor (for reduction) or further from the photoreceptor (for enlargement). While it is known to move a lens perpendicular to the optical path, from U.S. Pat. No. 4,040,733, referenced supra, these references do not disclose moving the lens so as to intersect the optical path at a different location. Japanese publication 60-78439 (Hashimoto) discloses a lens which both moves along the optical path and, at some point, is moved diagonally to a non-parallel optical path segment.

More particularly, the present invention is directed to a variable magnification copying apparatus for producing reduced or enlarged copies of an original document moving through a document exposure zone at a variable rate of movement in response to magnification values selected by an operator, said apparatus including:

means for producing output illumination to illuminate incremental line portions of the document as it passes through said exposure zone, line images reflected from said document being transmitted along an optical path, folded into a plurality of segments, onto a photoconductive surface, a symmetrical lens for forming an optical image of said original document on said photoconductive surface, said lens movable from a fixed position on a first segment of the optical path to a fixed position on a second segment of the optical path, a first mirror assembly positioned along the optical path between the lens and the exposure zone, said mirror assembly movable along the optical path, a second mirror assembly positioned between the lens and the photoconductive surface, said second mirror assembly movable along the optical path, means for moving said lens and first and second mirror assemblies in response to signals representing a selected magnification value, said movement resulting in adjustment of the object and image conjugates for the magnification values selected, and control means for receiving signals representing said magnification values and for operating said means for moving the lens and mirror assemblies to the required positions along the optical path, said control means further adapted to change the rate of movement of the original document through the exposure zone in response to said magnification value signals.

DESCRIPTION OF THE INVENTION

The variable magnification optical system will be described for use in a large engineering document copier such as the Xerox 2520, 3050 or 3090. The invention, however, can be practiced in a copier which reproduces conventional document sizes as well.

Figure 1:
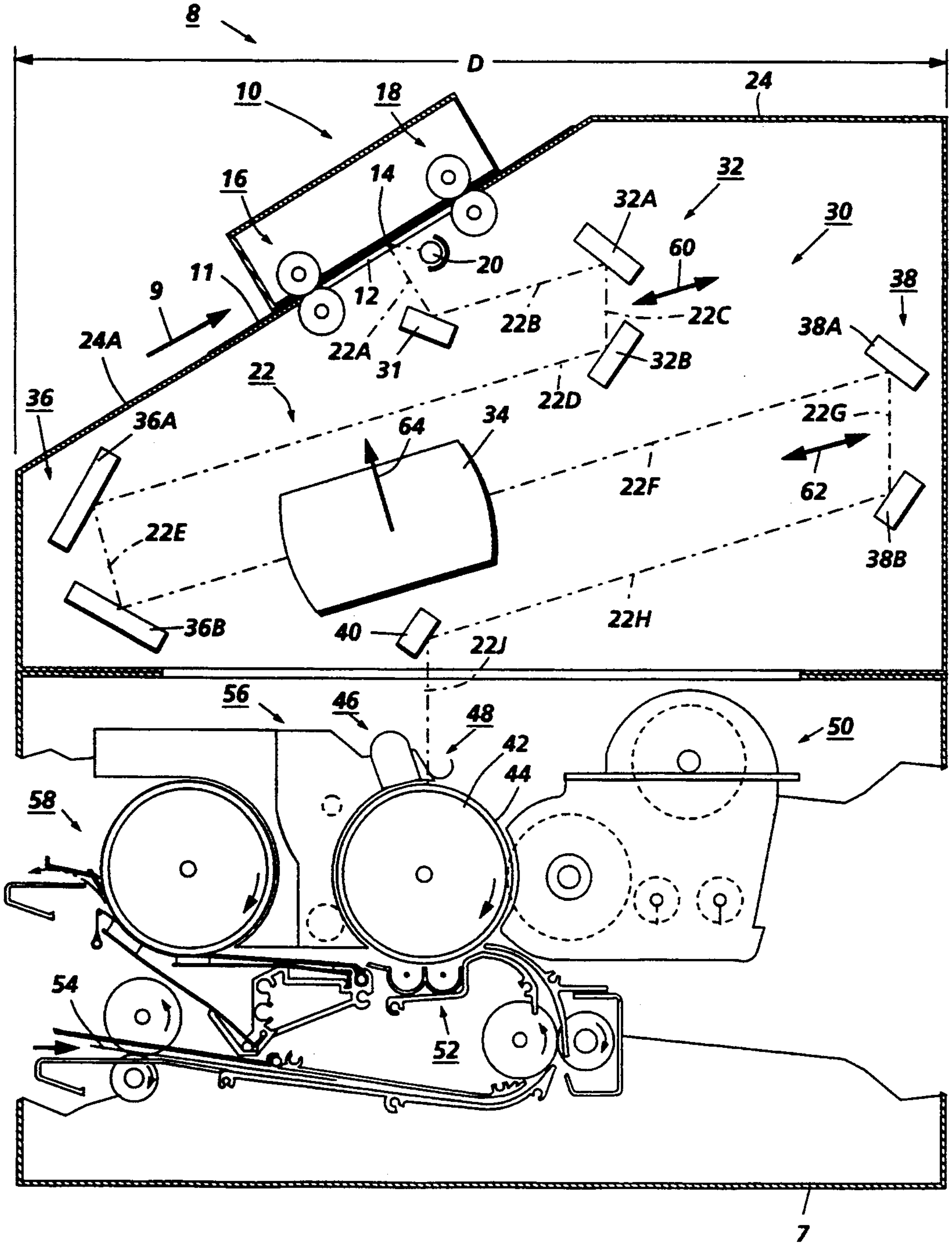
FIG. 1 shows a schematic, cross sectional view of a large document copier incorporating the variable magnification optical system of the present invention with the optical assembly components shown in a unity magnification along a folded optical path.

FIG. 1 shows a side view of an engineering copier 8 for copying large documents fed in the direction of arrow 9 by a constant velocity transport (CVT) feeder 10. Feeder 10 automatically transports individual documents 11 onto a narrow but full width platen 12 at a velocity matched to the particular magnification selected. The document is moved through an exposure zone and past a scanning line 14 which extends across the width of the platen. The document is optically scanned, line by line, as the document is moved therepast at a selected velocity. Transport feeder 10 has input and output feed roll pairs 16, 18, for moving the document across platen 12 at the selected velocity. Further details of an exemplary CVT feeder is described in U.S. Pat. No. 4,996,556, whose contents are hereby incorporated by reference. An exposure lamp 20 is provided to illuminate a strip like area of platen 12 (scanning line 14). The image rays reflected from the document lines being incrementally scanned are transmitted along an optical path 22. The variable magnification optical components are housed within a compact housing 24, housing 24 characterized by having a sloping front surface 24A, designed to permit large documents to be fed into CVT transport 10 at some angle of inclination, with respect to the horizontal plane (floor) in which the base 7 of the copier is seated. While an inclined document feed surface is preferred for optimum system compactness, the invention can also be practiced with the front surface located in a conventional, horizontal object plane.

Proceeding now with a description of the variable magnification optical system 30, system 30 includes a first, fixed scan mirror 31, a first, movable mirror assembly 32 comprising mirrors 32A, 32B, a constant focal length, wide angle lens 34, a second stationary mirror assembly 36 comprising mirrors 36A, 36B, a third movable mirror assembly 38 comprising mirrors 38A, 38B and a fixed drum mirror 40. These optical components are positioned, as shown in FIG. 1, to provide a unity magnification reproduction of a document 11 moved through the exposure zone. The light reflected from the document travels along optical path 22 and is reflected by mirrors 31, 32A, 32B, 36A, 36B projected through symmetrical lens 34, reflected from mirrors 38A, 38B and 40 and projected onto the surface 44 of a photoreceptor drum 42 at a magnification determined by the position of mirror assemblies 32, 38 and lens 34, as will be seen. The optical path 22, for purposes of description of the invention, can be referred to in terms of its path segments. Thus, path segment 22A extends from the platen to mirror 31; segment 22B from mirror 31 to mirror 32A; segment 22C from mirror 32A to mirror 32B; segment 22D from mirror 32B to mirror 36A; segment 22E from mirror 36A to mirror 36B; segment 22F from mirror 36B to mirror 38A; segment 22G from mirror 38A to mirror 38B; segment 22H from mirror 38B to mirror 40 and segment 22J from mirror 40 to 44 surface of drum 42. For the unity magnification position shown in FIG. 1, mirror pairs 32 and 38 are in a position where the object to lens conjugate (object conjugate) of lens 34 (sum of segments 22A, 22B, 22C, 22D, 22E, portion of 22F to lens 34 center) is equal to the image to lens conjugate (image conjugate) sum of portion of segment 22F from the lens center; 22G; 22H; 22J.

The scanning speed of document 11, for the unity magnification mode, is equal to the speed of drum 42 which rotates at a constant velocity. Drum photoreceptor 42 has a photoconductive surface 44. Other photoreceptor types such as belt, web, etc. may be used instead. Operatively disposed about the periphery of drum 42 are: a charge station 46 for placing a uniform charge on the photoconductive surface, an exposure station 48 where the previously charged surface 44 is exposed to image rays of the document being copied, development station 50 where the latent electrostatic image created on photoconductive surface 44 is developed by toner, transfer station 52 for transferring the developed image to a suitable copy substrate material such as a copy sheet 54 brought forward in timed relation with the developed image on surface 44 and cleaning station 56 for removing leftover developer from surface 44 and neutralizing residual charges thereon. Following transfer, sheet 54 is carried forward to a fusing station 58 where the toner image is fixed. These xerographic processing stations, and the steps incident to operation thereof, are well known in the prior art.

Figure 2:
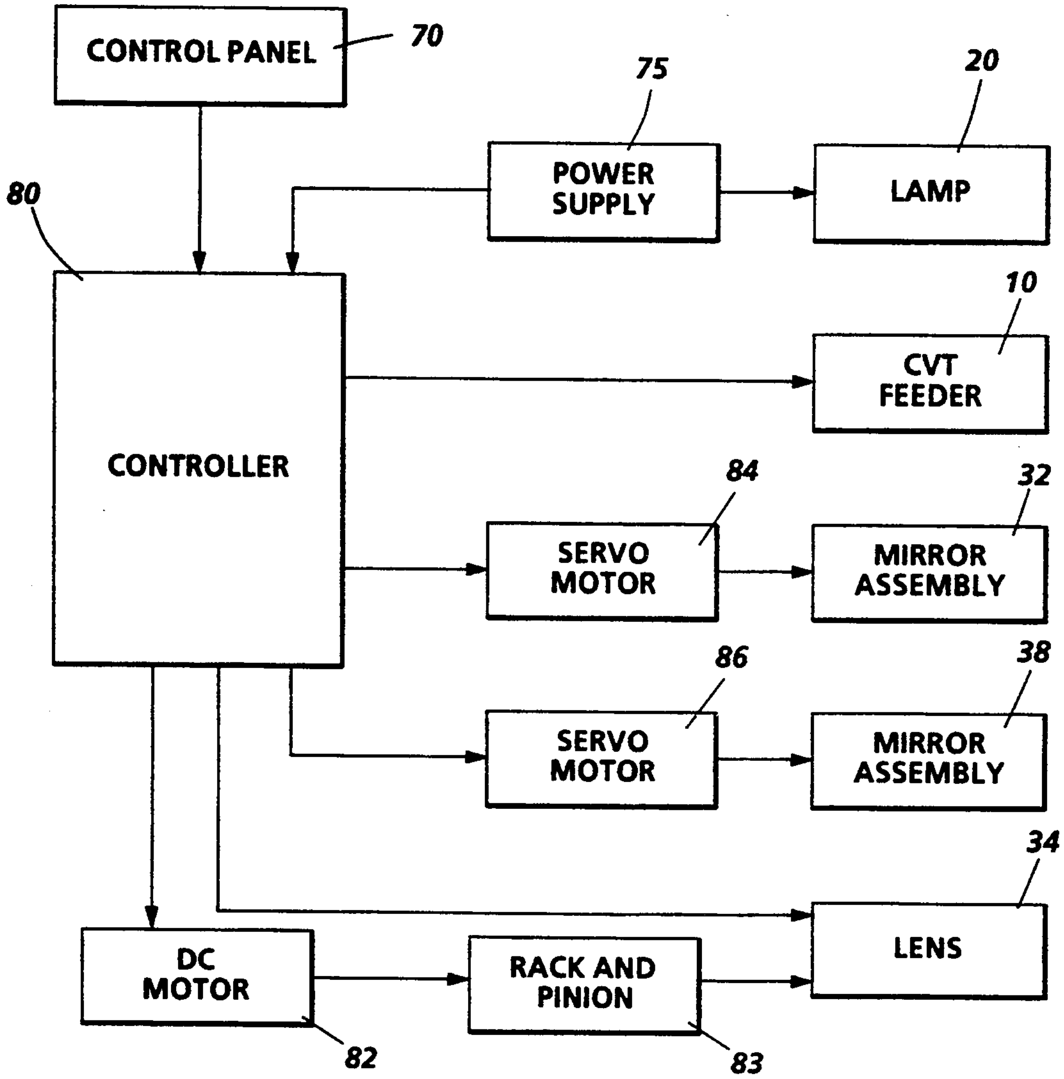
FIG. 2 is a schematic diagram of the circuitry controlling the operation of the movable optical elements in the variable magnification optical system of FIGS. 1,3 and 4.

The control of all copier and document handler operations is by a machine controller 80 (FIG. 2). Controller 80 preferably and conventionally comprises a known type of programmable microprocessor system, as exemplified by extensive prior art, e.g. U.S. Pat. No. 4,475,156. The particular desired functions and timings thereof are provided by conventional software programming of the controller 80 in non-volatile memory. The controller 80 controls all of the machine steps and functions described herein, including movement of lens 34 and mirror assemblies 32 and 38.

Turning now to a further consideration of the optical system 30 shown in FIG. 1, system 30 enables a variable reduction or enlargement of an original document extending from a 45% reduction to a 200% enlargement. In a preferred embodiment, lens 34 is a variable magnification symmetrical lens of the type disclosed in U.S. Pat. No. 4,953,958, whose contents are hereby incorporated by reference. The lens disclosed in the '958 patent is particularly well adapted to enable a wide magnification copying range, while correcting for coma and lateral chromatic aberrations, both of which are manifested when using a fixed focal length lens in a variable magnification system. For the embodiment shown, lens 34 has a focal length of 434 mm and has been slightly modified from that shown in the '958 patent by moving two, rather than four, of the internal lens elements and by slightly truncating the lens. These modifications are apparent to one skilled in the art and other modifications may be made depending upon specific system requirements.

According to the principles of the present invention, mirror assemblies 32 and 38 are movable in the direction of arrows 60, 62, respectively, in response to selection of a reduction or enlargement value by an operator at a control panel 70 (FIG. 2). Lens 34 is movable in the direction of the arrow 64 in response to selection of a predetermined magnification value which is outside of a predetermined range associated with the instant lens position. For the preferred embodiment, lens 34 remains stationary in the position shown in FIG. 1 over a magnification range of 0.45 to 1.00. Upon selection of a value greater than 1.0, the lens is moved from optical path segment 22F to the position shown in FIG. 4 on optical path segment 22D. This preferential movement will be better understood by providing the following operational sequence. It is assumed that operation of copier 8 is initiated with optical system 30 components in the position shown in FIG. 1. It is further assumed that an operator wishes to copy a document at a 0.45X reduction, setting in that value at control panel 70. Signals sent to controller 80 are analyzed by the internal software and a determination is made that no change is required to lens 34 position; e.g. the magnification selected is within the 0.45 to 1.0 range.

Figure 3:
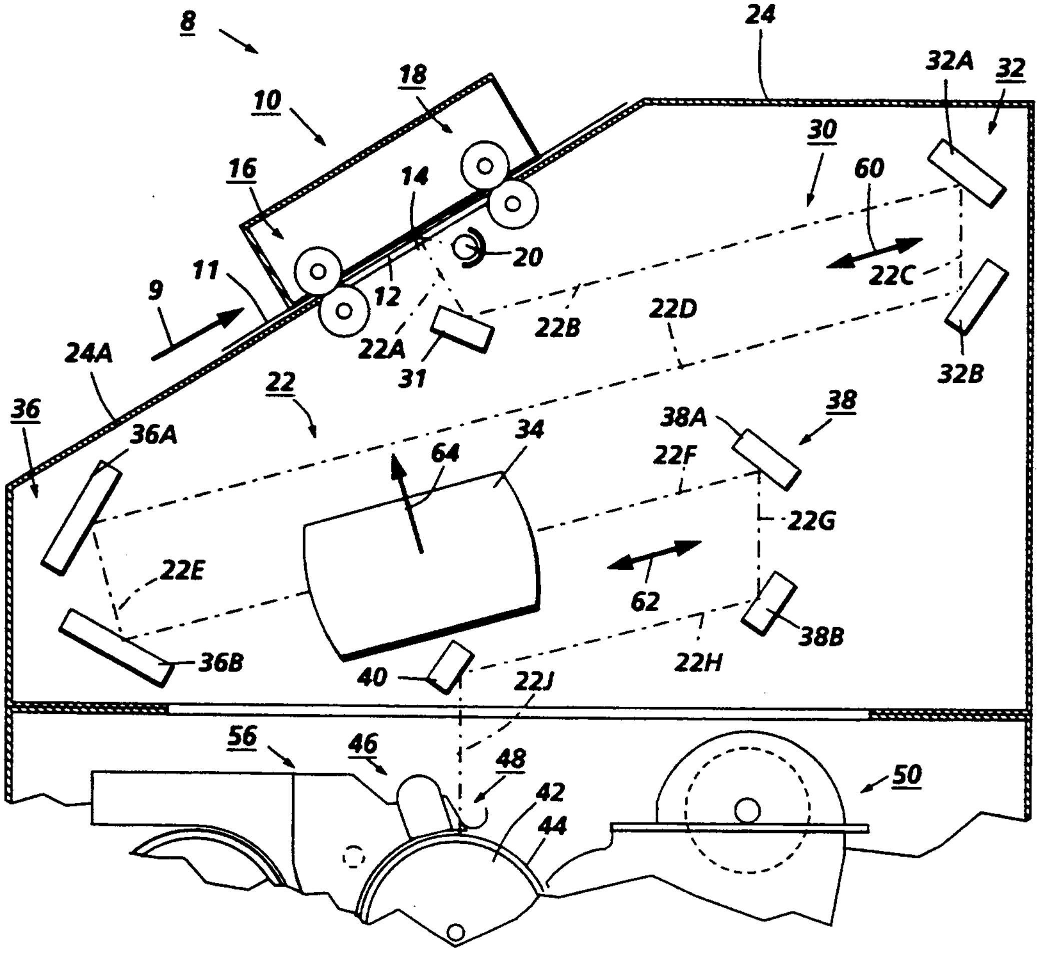
FIG. 3 shows the optical system of FIG. 1 with the optical assembly components in a 0.45 reduction position.

Computations are made for the new location or position required for mirror pairs 32 and 38 so as to realize the required object and image conjugate lengths for the 0.45X reduction. For this example, and as shown in FIG. 3, mirror assembly 32 is moved to the right (with reference to its FIG. 1 position) so as to increase the object conjugate, while lens assembly 38 is moved to the left to reduce the image conjugate. As one example, it is assumed that the total conjugate for the optical system of FIG. 1 is 1735 mm with the object and image conjugate lengths being 868 mm each (being measured to lens 34 center) and lens 34 having a nominal focal length of 440 mm with a focal shift of approximately 12 mm at 100%. Upon selection of the 0.45X reduction value, mirror assembly 32 moves to a new position shown in FIG. 3 to increase the object conjugate to 1433 mm while assembly 38 moves to a new position to decrease the image conjugate to 636 mm. The total conjugate increases to 2069 mm by adjustment of the lens elements in lens 34. As shown in FIG. 2, appropriate signals are generated by controller 80 which drives servo motors 84, 86, which, in turn, impart the required motion to mirror assemblies 32, 38, respectively. Signals are also sent to the lens 34 to adjust the internal lens elements. If another value is selected by an operator lying between 0.45X and 1.0X magnification, the mirrors would be moved to positions appropriate for maintaining the required new object and image conjugates and the document speed and lens 34 would be similarly adjusted.

As shown in FIG. 2, signals from the controller are also sent to the CVT feeder 10 to increase the velocity at which the document is moved across the platen. This reduces the length dimension of the document image formed at the drum 42 surface. The width dimension is determined by the width of the image on the mirrors, the width of the image depending upon the position of the mirrors relative to the lens. In a preferred embodiment, mirrors 31 and 40 are 36" long. Mirrors 32A, 32B, 38A, 38B are 31" long and mirrors 36A, 36B are 17" long.

It is further assumed that the next magnification selected by an operator is to copy a subsequent document at a 2.0X enlargement. Upon receipt of a signal from the control panel representing this value, controller 80 recognizes that the magnification is outside of the preselected 0.45X to 1.0X range. A signal is therefore, generated and sent to DC motor 82 which drives a rack and pinion drive assembly 83 mechanically and operatively coupled to lens 34. Lens 34 is moved in the direction of arrow 64 (in FIGS. 1 and 3) and perpendicular to optical path segment 22F to the new position shown on optical path segment 22D in FIG. 4. Simultaneously, signals are sent to servo motors 84, 86, causing mirror assemblies 32, 38, respectively, to move to the new positions shown in FIG. 4. Signals are also sent to CVT feeder 10 to decrease the speed of the document and to lens 34 to adjust the internal lens elements. For this enlargement value, the object conjugate is 660 mm and the image conjugate is increased to 1334 mm for a total conjugate of 1994 mm. Lens 34 will remain in the position shown in FIG. 4, as long as a subsequent magnification value selected by an operator remains in the range of 1.01X to 2.0X. It is understood that, upon selection of values within this range, the position of mirror assemblies 32, 38 are adjusted so as to maintain the required conjugates and that the document speed and lens 34 are adjusted appropriately.

The illumination requirements for illuminating the document at scan line 14 increase with magnifications above 1.0X to a maximum energy level at 2.0X, which is approximately nine times the illumination required to illuminate a document at 1.0X magnification. Controller 80 is programmed to control the operation of power supply 75 (FIG. 2) to adjust power to lamp 20 accordingly. Blowers (not shown) and establishment of a positive pressure air flow can provide cooling at the platen, if necessary.

To summarize the description of the invention, an optical system is provided for a copier which provides a magnification range of between 0.45 and 2.0. The optical components are located within a compact space by folding the optical path along a plurality of path segments and by moving the projection lens in a novel manner between two optical path segments, rather than along the optical path as in the prior art. Magnification is enabled by moving a fixed, focal length lens between a first location on an optical path segment, the lens remaining in a fixed position if magnification modes are selected within a predetermined range (0.45 to 1.0X). The mirror assemblies are moved along the optical path to provide the required object and image conjugate adjustments in response to magnification selections made at a control panel. For magnification selections in the range of 1.01 to 2.0X, the lens is moved to a new position along an adjacent segment of the optical path and the mirror pairs are again moved to the required positions to adjust the object and image conjugates.

Figure 4:
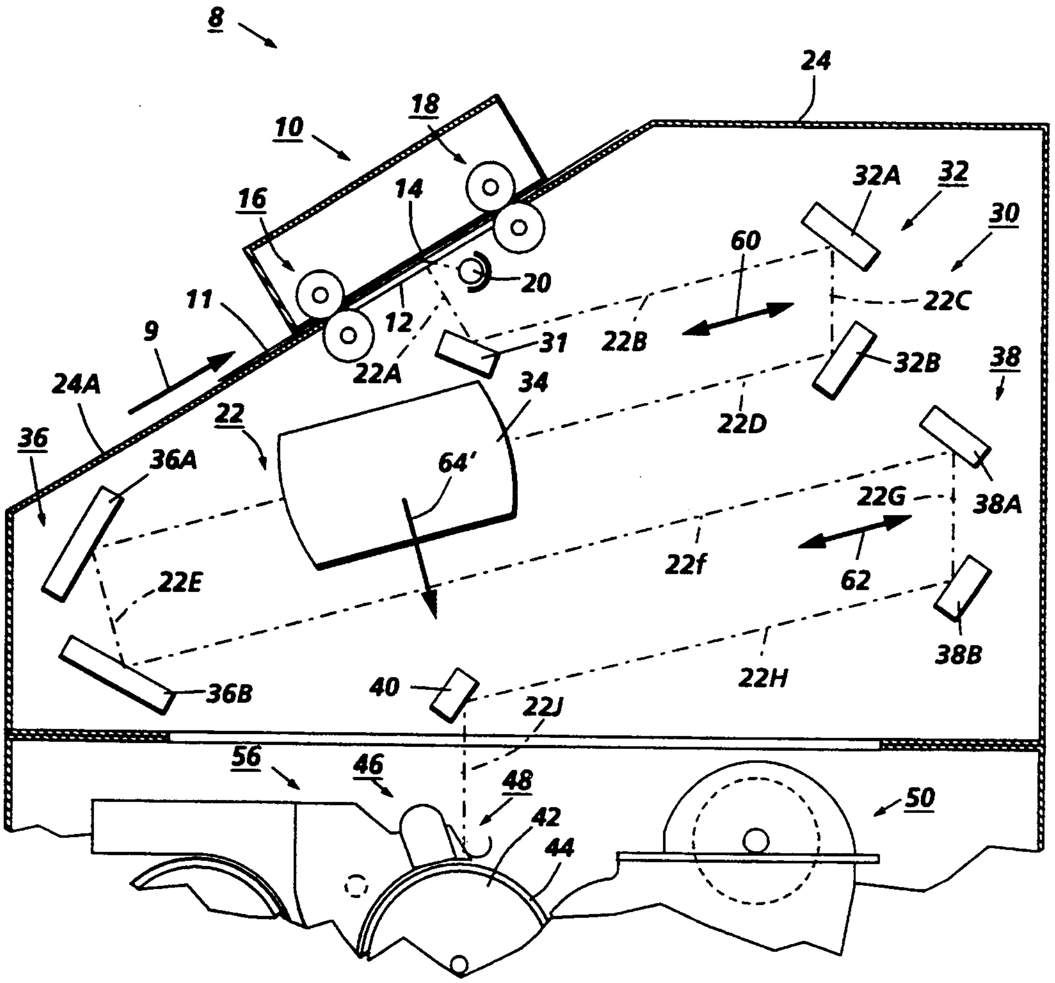
FIG. 4 shows the optical system of FIG. 1 with the optical components in a 2.0 enlargement position.

With the embodiment shown in FIGS. 1,3 and 4, incorporating the inclined document transport and with the optical path positioned along a generally diagonal orientation, and with the exemplary total conjugate distances indicated, this embodiment results in a total depth of the copier (distance D in FIG. 1) of less than 29". This is a critical dimension in the industry because of handling and shipping requirements which increase when the depth of a machine increases beyond this point. The invention, however, can be used in machines having a horizontal document transport surface, but this might extend the distance D dimension beyond the 29" threshold. The use of a constant focal length lens, rather than a zoom lens saves both in cost and results in a reduced amount of optical components. However, the advantage of compactness can be realized to an even greater degree if a zoom lens is used in place of the fixed conjugate lens. The use of the zoom lens enables magnification ranges less than 0.45 and greater than 2.00. While the optical assembly is shown in combination with a xerographic processor station, the assembly can be constructed and used as a stand alone optical module, which can be retrofitted and added to other marking engines conventionally located beneath a document platen.

While the invention has been described with reference to the structure disclosed, it will be appreciated that numerous changes and modifications are likely to occur to those skilled in the art, and it is intended to cover all changes and modifications which fall within the true spirit and scope of the invention.

We claim:

1. A variable magnification copying apparatus for producing reduced or enlarged copies of an original document moving through a document exposure zone at a variable rate of movement in response to magnification values selected by an operator, said apparatus including:

means for producing output illumination to illuminate incremental line portions of the document as it passes through said exposure zone, line images reflected from said document being transmitted along an optical path, folded into a plurality of segments, onto a photoconductive surface, a symmetrical lens for forming an optical image of said original document on said photoconductive surface, said lens movable from a fixed position on a first segment of the optical path to a fixed position on a second segment of the optical path, said first and second segments lying in adjacent, parallel planes, a first mirror assembly positioned along the optical path between the lens and the exposure zone, said mirror assembly movable along the optical path, a second mirror assembly positioned between the lens and the photoconductive surface, said second mirror assembly movable along the optical path, means for moving said lens and first and second mirror assemblies in response to signals representing a selected magnification value, said movement resulting in adjustment of the object and image conjugates for the magnification values selected, and control means for receiving signals representing said magnification values and for operating said means for moving the lens and mirror assemblies to the required positions along the optical path, said control means further adapted to change the rate of movement of the original document through the exposure zone in response to said magnification value signals.

2. The apparatus of claim 1 wherein said lens remains in a fixed position on said first or second optical path segment as long as the magnification value is selected within a specified range, said lens moving to the other segment when the magnification value selected is outside of said specified range.

3. The apparatus of claim 2 wherein the total magnification value range is between 0.45X to 2.0X and wherein said first optical path segment is further from the exposure zone than the second segment, and wherein the lens position on said first segment remains fixed so long as the magnification values are selected from the range extending from 0.45X to 1.0X.

4. The apparatus of claim 3 wherein said lens moves to said second segment upon selection of a magnification value in a range from 1.01 to 2.0X, said lens remaining in the fixed location on said second segment until selection of a magnification value within the 0.45 to 1.0X range.

5. The apparatus of claim 1 wherein said apparatus is seated in a horizontal plane, said exposure zone located in a plane inclined upward with respect to said horizontal plane.

6. The apparatus of claim 1 wherein said optical path has a diagonally folded orientation with respect to said horizontal plane.

7. The apparatus of claim 1 wherein said lens is a fixed focal length wide angle lens.

8. The apparatus of claim 1 wherein said lens is a zoom lens.

9. The apparatus of claim 1 wherein said control means is further adapted to increase output illumination of said illumination means in response to magnification values selected above a predetermined magnification.

10. A variable magnification optical system comprising:

means for illuminating an incremental line portion of a document moving through an exposure zone and for reflecting line images of said document along an optical path, a lens for forming an optical image of said original document, said lens being capable of moving in a direction perpendicular to its position on one segment of an optical path to another segment of the optical path, and a first and second mirror assembly movably positioned along the optical path, said mirrors moved in response to selection of magnification values so as to maintain required image and object conjugates.

11. The variable magnification apparatus of claim 1 wherein said lens is a zoom lens.

* * * * *